United States Patent
Harmon

(10) Patent No.: US 10,694,660 B2
(45) Date of Patent: Jun. 30, 2020

(54) COMMODITY DELIVERY SYSTEM FOR WORK VEHICLE WITH ROTARY MANIFOLD REGULATOR

(71) Applicant: Deere & Company, Moline, IL (US)

(72) Inventor: Andrew W. Harmon, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/013,679

(22) Filed: Jun. 20, 2018

(65) Prior Publication Data
US 2019/0387666 A1    Dec. 26, 2019

(51) Int. Cl.
*B65G 53/66*   (2006.01)
*A01C 7/20*    (2006.01)
*B65G 53/56*   (2006.01)

(52) U.S. Cl.
CPC ........... *A01C 7/20* (2013.01); *B65G 53/56* (2013.01)

(58) Field of Classification Search
CPC ......... B65G 53/56; B60P 1/60; A01D 87/10; A01C 7/20; A01C 7/084; A01C 7/163; A01C 15/04; F16K 5/02; F16K 5/0207; F16K 5/0235; Y10T 137/87909
USPC .. 406/39, 40, 41, 42, 43, 44, 182, 183, 197; 111/174–175; 137/875
See application file for complete search history.

(56) References Cited

U.S. PATENT DOCUMENTS

| | | | |
|---|---|---|---|
| 1,217,938 A | 3/1917 | Guice | |
| 2,400,703 A * | 5/1946 | Smith | B65G 53/56 406/182 |
| 3,515,315 A * | 6/1970 | Kidd | A01C 7/084 406/182 |
| 4,007,842 A * | 2/1977 | Hough | B65G 65/32 406/182 |
| 4,138,161 A * | 2/1979 | Payne | B05B 5/1683 406/155 |
| 4,522,291 A * | 6/1985 | Smick | A01C 7/206 111/150 |

(Continued)

FOREIGN PATENT DOCUMENTS

WO    2013105021 A1    7/2013

OTHER PUBLICATIONS

European Search Report issued in counterpart application No. 19180348.5 dated Aug. 12, 2019. (8 pages).

*Primary Examiner* — Joseph A Dillon, Jr.
(74) *Attorney, Agent, or Firm* — Klintworth & Rozenblat IP LLP

(57) ABSTRACT

A work vehicle includes a delivery system that distributes commodity from the source between a plurality of delivery runs. The delivery system includes at least one commodity manifold. The commodity manifold includes a first run structure with a first run passage, a second run with a second run passage, and a manifold regulator with a body that is rotatable about a rotation axis between a first position and a second position. The body at least partly defines a channel configured to receive and distribute the commodity. The channel has an inlet and an outlet. The outlet is in communication with the first run passage and disconnected from the second run passage in the first position. The outlet is in communication with the second run passage and disconnected from the first run passage in the second position.

19 Claims, 5 Drawing Sheets

(56) References Cited

U.S. PATENT DOCUMENTS

| | | | | |
|---|---|---|---|---|
| 4,528,919 | A * | 7/1985 | Harbolt | A01C 23/024 111/175 |
| 4,564,318 | A * | 1/1986 | Alexandrov | B65G 51/22 406/182 |
| 5,741,094 | A * | 4/1998 | Heep | B65G 53/56 406/182 |
| 5,845,818 | A | 12/1998 | Gregor et al. | |
| 6,074,136 | A * | 6/2000 | Steele | B65G 51/24 406/182 |
| 6,120,211 | A * | 9/2000 | Raike | E04H 4/0006 137/875 |
| 6,213,690 | B1 | 4/2001 | Gregor et al. | |
| 6,247,877 | B1 * | 6/2001 | Rost | B65G 53/56 137/876 |
| 6,345,645 | B1 * | 2/2002 | Kenna | F16K 11/085 137/624.13 |
| 6,494,151 | B1 * | 12/2002 | Wark | F23K 3/02 110/129 |
| 6,811,358 | B2 * | 11/2004 | Bauver | B65G 53/528 406/113 |
| 6,857,861 | B2 * | 2/2005 | Condon | F04B 7/0241 137/625.11 |
| 8,001,994 | B2 * | 8/2011 | Miller | B08B 5/02 137/874 |
| 8,641,329 | B2 * | 2/2014 | Barrios | B65G 51/14 137/875 |
| 9,686,907 | B2 * | 6/2017 | Hui | A01C 7/084 |
| 10,302,203 | B2 * | 5/2019 | You | F16K 5/0235 |
| 2003/0024579 | A1 * | 2/2003 | Blackmore | B65G 47/72 137/625.11 |
| 2003/0131895 | A1 * | 7/2003 | Mitomo | B65G 53/56 137/625.47 |
| 2005/0211802 | A1 | 9/2005 | Newton | |
| 2005/0236051 | A1 * | 10/2005 | McBeth | F16K 11/074 137/625.11 |
| 2007/0079882 | A1 * | 4/2007 | Muller | B65G 53/56 137/625.46 |
| 2010/0032033 | A1 * | 2/2010 | Okabe | B65G 53/56 137/595 |
| 2010/0065140 | A1 * | 3/2010 | Joynson | B65G 51/24 137/625.44 |
| 2010/0275759 | A1 * | 11/2010 | Hsiao | F16K 5/02 84/396 |
| 2011/0170962 | A1 * | 7/2011 | Watson | B65G 53/56 406/108 |
| 2012/0174844 | A1 | 7/2012 | Friggstad | |
| 2012/0318390 | A1 * | 12/2012 | Yi | B65G 53/32 137/625 |
| 2013/0008543 | A1 | 1/2013 | Kaminsky et al. | |
| 2014/0311598 | A1 * | 10/2014 | Hui | A01C 7/084 137/556.6 |
| 2015/0345648 | A1 * | 12/2015 | Henke | B65G 53/56 137/625.44 |
| 2017/0086353 | A1 | 3/2017 | Borkgren et al. | |
| 2017/0246642 | A1 * | 8/2017 | Bianca | F02K 1/00 |
| 2017/0320422 | A1 * | 11/2017 | Roberge | B60P 1/00 |

* cited by examiner

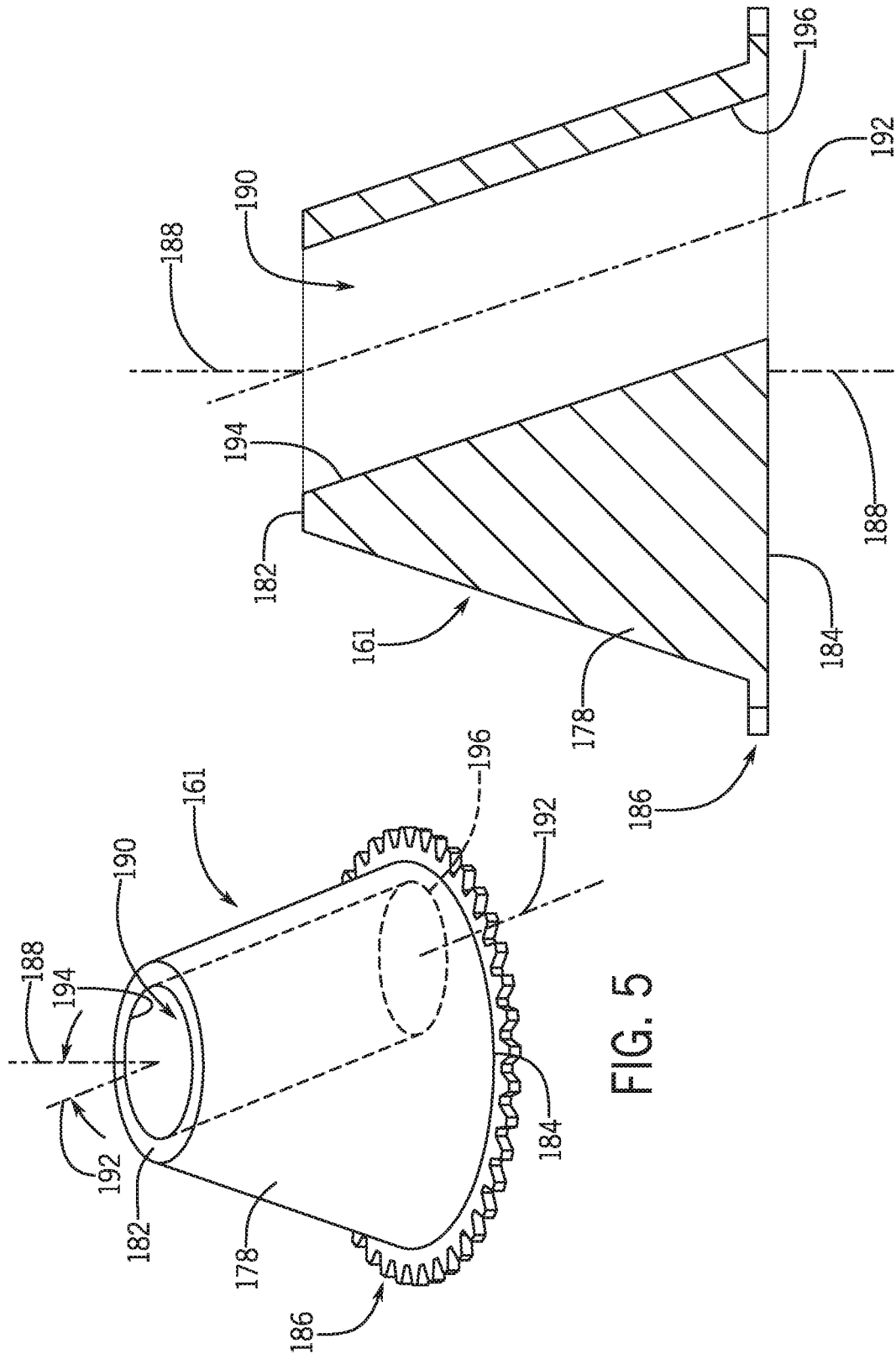

COMMODITY DELIVERY SYSTEM FOR WORK VEHICLE WITH ROTARY MANIFOLD REGULATOR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity delivery system for a work vehicle with a rotary manifold regulator for selectively changing the delivery path for the commodity.

BACKGROUND OF THE DISCLOSURE

Seeding work vehicles, such as air carts/seeders and other seeding devices, are configured for applying seed, fertilizer, and/or other particulate commodities to a field. The work vehicle may be operatively connected to tilling equipment for applying the commodity under the surface of the soil.

Seeding work vehicles typically include one or more tanks and a metering system that meters out a predetermined quantity of the commodity from the tank as the work vehicle moves across the field. These vehicles often include a delivery system for delivering the commodity to one or more row units for delivery to the soil.

It may be desirable to include a delivery system that includes a plurality of different runs, wherein each run provides a different delivery path for the commodity. The delivery system may have a variety of selectable configurations. In different configurations, the commodity may be delivered along different paths. However, the plurality of runs may make the delivery system bulky and/or difficult to package and support on the work vehicle. Sealing the delivery system (e.g., to maintain needed air pressure within the runs) may be problematic as well. Furthermore, it may be cumbersome, time consuming, or otherwise difficult to select between the different runs.

SUMMARY OF THE DISCLOSURE

This disclosure provides an improved commodity delivery metering system for a work vehicle. This disclosure also provides methods for operating the same.

In one aspect, the disclosure provides a work vehicle that includes a commodity source and a delivery system configured to receive a commodity from the commodity source and distribute the commodity between a plurality of delivery runs. The delivery system includes at least one commodity manifold. The commodity manifold includes a first run structure with a first run passage, a second run with a second run passage, and a manifold regulator with a body that is rotatable about a rotation axis between a first position and a second position. The body at least partly defines a channel configured to receive and distribute the commodity. The channel has an inlet and an outlet. The inlet is in communication with the commodity source in the first position and the second position. The outlet is in communication with the first run passage and disconnected from the second run passage in the first position. The outlet is in communication with the second run passage and disconnected from the first run passage in the second position.

In another aspect, the disclosure provides a method of operating a delivery system of a work vehicle for selective distribution of a commodity from a commodity source. The method includes selectively rotating a body of a manifold regulator about a rotation axis between a first position and a second position. The body at least partly defines a channel configured to receive and distribute the commodity. The channel has an inlet and an outlet. The inlet is in communication with the commodity source in the first position and the second position. The method further includes communicating, in the first position, the outlet with a first run passage of a first run structure and disconnecting the outlet from a second run passage of a second run structure. Moreover, the method includes communicating, in the second position, the outlet with the second run passage and disconnecting the outlet from the first run passage.

In an additional aspect, the disclosure provides a work vehicle that includes a commodity source and a delivery system configured to receive a commodity from the commodity source and move the commodity away from the work vehicle. The delivery system includes at least one run structure with a run passage and a regulator with a body that is rotatable about a rotation axis between a first position and a second position. The body at least partly defines a channel configured to receive the commodity from the commodity source. The channel has an inlet and an outlet. The inlet is in communication with the commodity source in the first position and the second position. The outlet is in communication with the run passage in the first position, and the outlet is disconnected from the run passage in the second position.

The details of one or more embodiments are set forth in the accompanying drawings and the description below. Other features and advantages will become apparent from the description, the drawings, and the claims.

BRIEF DESCRIPTION OF THE DRAWINGS

FIG. 5 is an isometric view of a manifold regulator of the commodity manifold of FIG. 3; and FIG. 6 is a section view of the manifold regulator of FIG. 5.

Like reference symbols in the various drawings indicate like elements.

DETAILED DESCRIPTION

Figure 1:
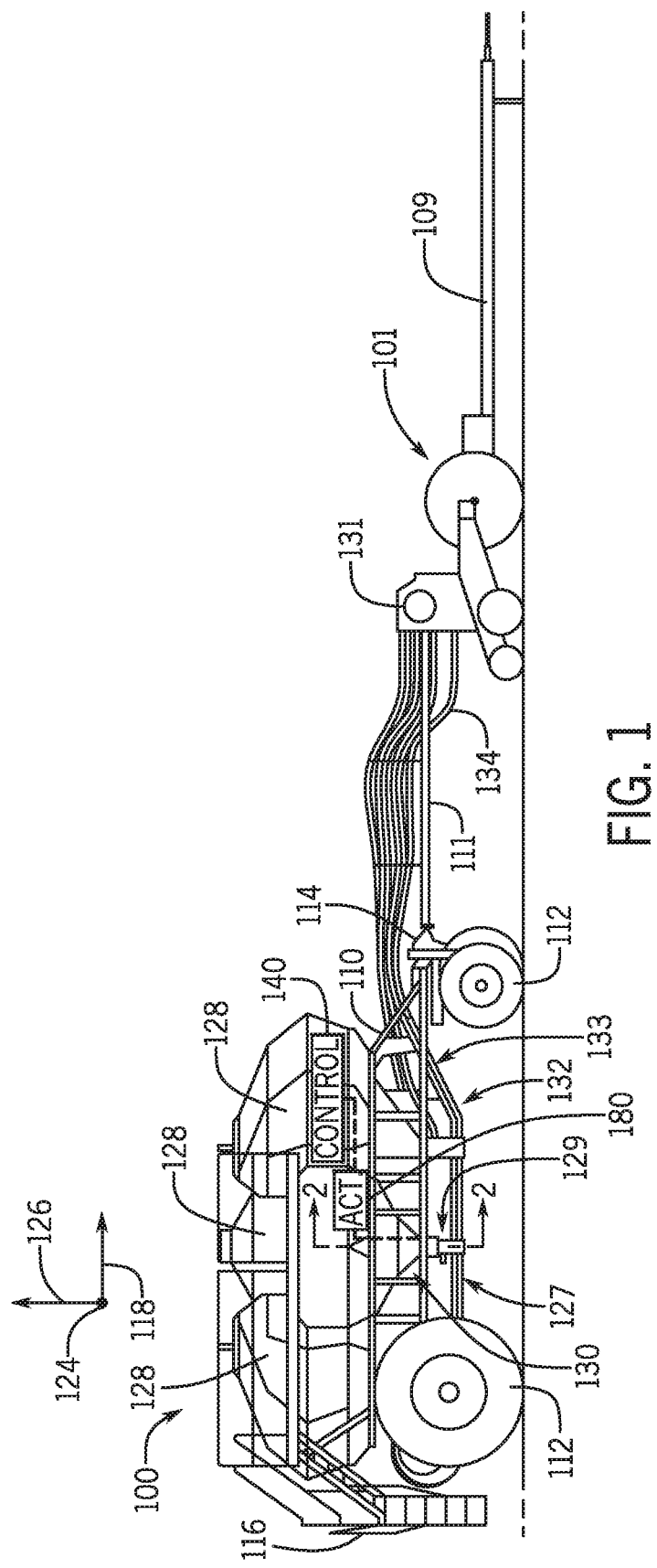
FIG. 1 is a side view of a work vehicle according to example embodiments of the present disclosure.

The following describes one or more example embodiments of a commodity delivery system for a work vehicle (e.g., an air cart, commodity cart, etc.), its control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of a work vehicle delivery system for delivering a commodity away from the vehicle (e.g., to a plurality of row units that deliver the commodity to the soil) as shown in the accompanying figures of the drawings described briefly above. The delivery system may be configured to receive a commodity from the commodity source and selectively distribute the commodity between a plurality of runs. The individual runs may define separate and individual pathways for the commodity to travel from the work vehicle toward a downstream component and/or to the soil.

More specifically, the work vehicle may include a delivery system with a plurality of run structures. The run structures may comprise tubes, pipes, lines, or other elongate conduits. The run structures may be attached to downstream components (e.g., downstream distribution manifolds, row units, etc.). The delivery system may include at least one manifold regulator (i.e., selector, valve, etc.) that may move between different positions such that commodity is routed toward a selected one of the run structures. In one position of the manifold regulator, commodity may be routed from a source to one of the run structures. In another position, the commodity may be routed from the source to another of the run structures.

In some embodiments, the manifold regulator may be supported for rotation about an axis. Rotation of the manifold regulator may change the selected pathway for the commodity through the delivery system.

In some embodiments, the work vehicle delivery system may include at least two runs and a manifold regulator arranged in a commodity manifold. The manifold regulator may be operably connected to a first run and a second run and may be selectively moved to change the downstream pathway through the commodity manifold from the first run to the second run. In additional embodiments, the manifold regulator may be operably connected to a first run, a second run, and at least one additional run. It will be appreciated, thus, that the manifold regulator may be operably connected to any number of runs of a delivery system without departing from the scope of the present disclosure.

The delivery system may also be arranged into a plurality of commodity manifolds. The commodity manifolds may respectively include a manifold regulator for selecting the pathway for the commodity therethrough. In some embodiments, the manifold regulators may be operatively attached for actuating simultaneously. Also, automatic actuators and/or a control system may be included for automatically actuating, position sensing, and/or other operations of the delivery system.

The delivery system may also be arranged in a compact manner. For example, one or more portions of the run structures may be arranged substantially parallel to each other. Also, the run structures may be arranged in rows that are offset horizontally and/or vertically. As such, the run structures may be arranged in a compact manner. The manifold regulators may be attached to the respective run structures in a compact manner as well (e.g., with the axis of rotation of the regulator being substantially perpendicular to the axes of the run structures).

Accordingly, the delivery system may selectively distribute the commodity along a large number of potential pathways towards the row units. Even so, the delivery system may be arranged in a compact and well-organized manner. Also, the overall part count may remain relatively low. Additionally, sealing of the components (e.g., air sealing around the manifold regulator) may be achieved effectively with relatively few parts.

FIG. 1 illustrates a work vehicle 100 according to example embodiments of the present disclosure. In the illustrated embodiment, the work vehicle 100 may be towed by another vehicle, such as a tractor (not shown). In other embodiments, the work vehicle 100 of the present disclosure may be a self-propelled vehicle. In some embodiments, the work vehicle 100 may be an air cart or air drill that contains a bulk amount of a commodity, that meters out the commodity from the bulk amount, and that moves the metered commodity away from the work vehicle 100 for planting in the ground. In some embodiments, the commodity delivered from the work vehicle 100 may be metered further downstream before being planted.

The work vehicle 100 shown in FIG. 1 is merely an example embodiment of the present disclosure. One or more features of the present disclosure may be included on a different work vehicle, such as a planter, a commodity cart, or other work vehicle without departing from the scope of the present disclosure.

A longitudinal axis 118 (i.e., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1. The lateral axis 124 may be perpendicular to the longitudinal axis 118 and may extend between opposite lateral sides of the work vehicle 100. Furthermore, a vertical axis 126 is indicated in FIG. 1 for reference purposes.

The work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together and arranged in series along the lateral axis 124. Thus, although only one row unit 101 is shown in FIG. 1, it will be appreciated that similar row units 101 may be included and disposed in series along the lateral axis 124. The row units 101 may be connected to the work vehicle 100 via a rear tow bar 111.

The row units 101 may also be connected to the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected to the work vehicle 100 (i.e., directly connected to the frame of the work vehicle 100) without departing from the scope of the present disclosure.

As shown in FIG. 1, the work vehicle 100 may include a frame 110 (i.e., chassis) and a plurality of wheels 112. The frame 110 may be assembled from rigid beams, bars, brackets, or other structures and may support the components described in detail below. The wheels 112 may support the frame 110 on terrain and enable movement of the vehicle 100 across the terrain. As shown, the frame 110 may extend between a front end 114 and a rear end 116 of the work vehicle 100. The tow bar 111 may extend from the frame 110 at the front end 114 for attaching the work vehicle 100 to the row units 101.

The work vehicle 100 may further include one or more commodity containers 128 (tanks, vessels, or other commodity source). The containers 128 may be supported on the frame 110. The commodity containers 128 may contain seed, fertilizer, and/or another particulate or granular commodity. Additionally, in some embodiments, the containers 128 may include a liquid commodity. There may be any number of containers 128. In the illustrated embodiment, for example, there are four commodity containers 128, one of which is hidden from view.

Additionally, the work vehicle 100 may include at least one metering system 130. The metering system 130 may be a volumetric metering system. The metering system 130 may be configured to receive commodity from the commodity container 128 and may meter commodity to a downstream component. In some embodiments, the metering system 130 may be supported by the frame 110 and may be disposed generally underneath the commodity container(s) 128. The work vehicle 100 may include a plurality of metering elements (e.g., metering rollers) that actuate to meter out the commodity from the commodity container 128. During operation, particles of the commodity within one of the containers 128 may move vertically downward toward the metering system 130. The metering system 130 may operate to meter out the commodity from the container 128 at a controlled rate as the vehicle 100 moves across the field.

The work vehicle 100 may also include a delivery system 132. The delivery system 132 may include at least one delivery run 133. The delivery run(s) 133 may define a fluid pathway for delivery of the commodity away from the work vehicle 100. In some embodiments, a plurality of the runs 133 may include a respective run structure 127 (i.e., a primary tube or pipe) that is supported below the metering system 130. The run structures 127 may be rigid pipe segments that are fixed to the frame 110. The run structures 127 may be in fluid communication with downstream components (e.g., downstream pipe segments in the respective run 133, downstream manifolds, and/or the row units 101).

The runs 133 may conduct a flow of air from the rear end 116 to the front end 114 and away from the work vehicle 100. Airflow within the runs 133 may be generated by a fan or other source mounted on the vehicle 100.

Additionally, the runs 133 may be operably connected to the metering system 130 such that particles of the commodity metered out by the metering system 130 may be received by selected ones of the runs 133. In some embodiments, the particles may move substantially vertically downward into the selected runs 133. Once in the runs 133, the air stream therein may propel the metered particles away from the work vehicle 100 and toward the row units 101.

In some embodiments, at least one run 133 of the delivery system 132 may be operably connected to a downstream metering system 131. As shown in FIG. 1, the downstream metering system 131 may be supported by the row unit 101. It will be appreciated that a plurality of row unit 101 may include respective downstream metering systems 131. Additionally, in some embodiments, some row units 101 may include a respective downstream metering system 131 and others may not. In some embodiments, the downstream metering system 131 may be a singulating metering system that receives commodity via one of the runs 133 and that meters out singulated particles of the commodity therefrom for planting.

Furthermore, the delivery system 132 may include at least one manifold regulator 129. The manifold regulator 129 may be supported by the frame 110 in some embodiments. The manifold regulator 129 may be operably disposed between the metering system 130 and two or more of the run structures 127. As will be discussed, the manifold regulator 129 may be configured for selectively changing the pathway for the commodity through the delivery runs 133. For example, the manifold regulator 129 may have a first position in which commodity metered from the metering system 130 moves to one of the runs 133 for delivery to a respective row unit 101. The manifold regulator 129 may have a second position in which commodity metered from the metering system 130 moves to another of the runs 133 for delivery to a different row unit 101.

In some embodiments, the manifold regulator 129 may be manually moved by an operator between the different positions to select between the different pathways for the commodity through the delivery system 132. In other embodiments, movement of the manifold regulator 129 may be at least partly automated. For example, a user may select which of the runs 133 will be used to deliver the commodity, and an actuator 180 (e.g., an electric motor, a hydraulic actuator, a pneumatic actuator) may be included to automatically actuate the manifold regulator 129 accordingly.

Moreover, the work vehicle 100 may include a control system 140. The control system 140 may include and/or communicate with various components of a computerized device, such as a processor, a data storage device, a user interface, etc. The control system 140 may be in communication with and may be configured for controlling the metering system 130, the delivery system 132, the actuator 180, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the delivery system 132, the actuator 180, etc.

In some embodiments, during operation of the work vehicle 100 (e.g., when towed by a tractor or other towing vehicle), the control system 140 may control the metering system 130 (e.g., by controlled actuation of the metering rollers), which allows a controlled quantity of particles to pass into the delivery system 132 at a predetermined rate. The manifold regulator 129 may be disposed in a predetermined position (e.g., positioned manually or automatically with the actuator 180) to direct the metered commodity to predetermined ones of the delivery runs 133 of the delivery system 132. Then the commodity may be delivered to respective ones of the row units 101 to be planted within the soil.

Figure 2:
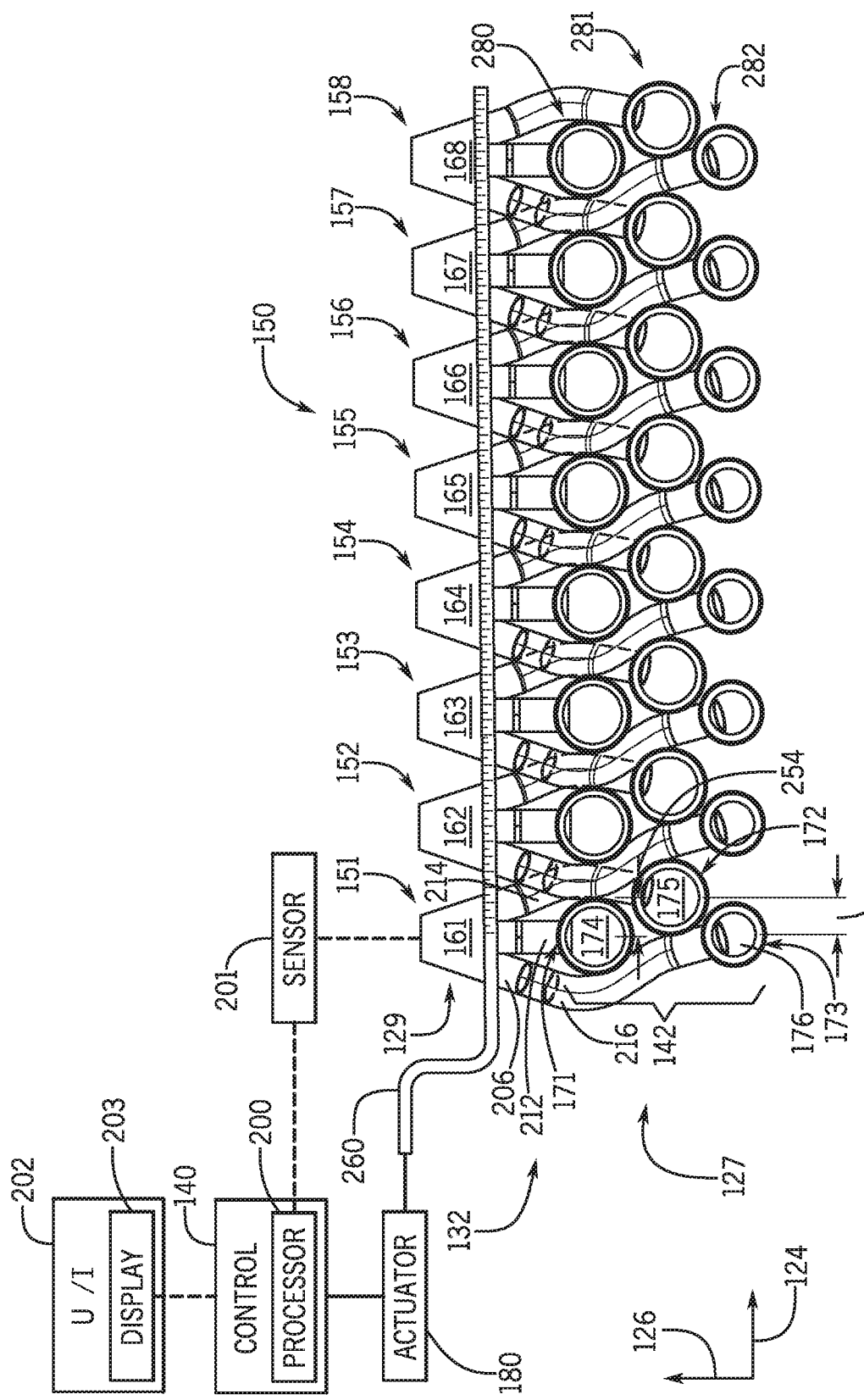
FIG. 2 is a section view of a delivery system the work vehicle taken along the line 2-2 of FIG. 1 according to example embodiments.

Referring now to FIG. 2, parts of the delivery system 132 are illustrated in detail and will be discussed in greater detail according to example embodiments. It will be appreciated that certain parts of the work vehicle 100 are hidden for clarity.

The delivery system 132 may be arranged in a plurality of commodity manifolds 150. For example, as shown in the illustrated embodiment, there may be a first commodity manifold 151, a second commodity manifold 152, a third commodity manifold 153, a fourth commodity manifold 154, a fifth commodity manifold 155, a sixth commodity manifold 156, a seventh commodity manifold 157, and an eighth commodity manifold 158.

Figure 3:
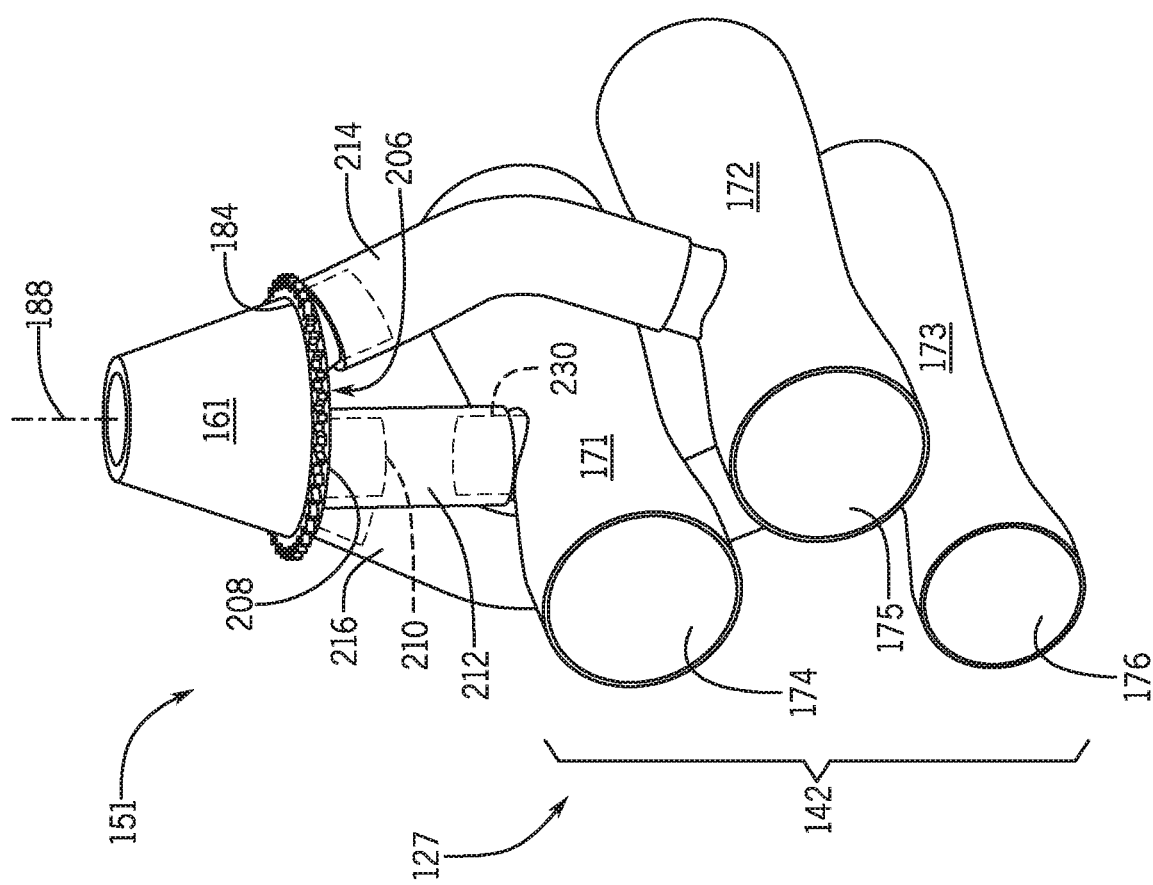
FIG. 3 is an isometric view of a commodity manifold of the delivery system according to example embodiments of the present disclosure.
Figure 4:
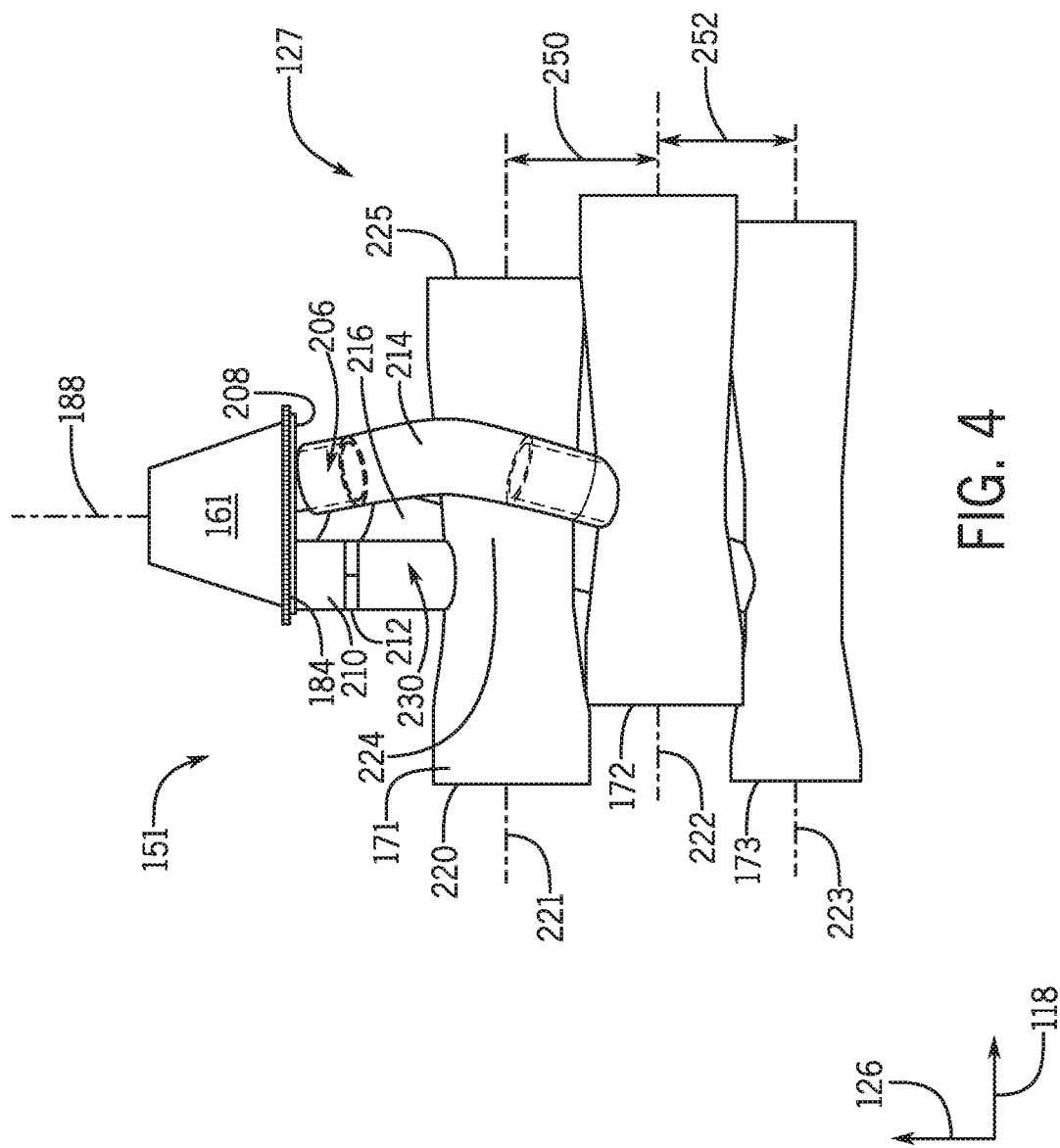
FIG. 4 is a side view of the commodity manifold of FIG. 3.

The first commodity manifold 151 is shown independently in FIGS. 3-4 and may be representative of the other commodity manifolds 152-158. The commodity manifold 151 may include one of the manifold regulators 129, namely, a first manifold regulator 161. The first commodity manifold 151 may also include a sub-set 142 of the plurality of run structures 127. The sub-set 142 may include a first run structure 171, a second run structure 172, and a third run structure 173. The first run structure 171 defines a first run passage 174. The second run structure 172 defines a second run passage 175. The third run structure 173 defines a third run passage 176. The first manifold regulator 161 may be configured for selectively distributing commodity between the first, second, and third run passages 174, 175, 176.

The first manifold regulator 161 (as well as the other manifold regulators 129) may have a variety of shapes without departing from the scope of the present disclosure. For example, the outer profile of the first manifold regulator 161 may resemble a solid of revolution that is centered about an axis 188.

As shown in FIGS. 5 and 6, the first manifold regulator 161 may include a body 178 with a first end 182 and a second end 184. The body 178 may be tapered between the first end 182 and the second end 184. For example, the body 178 may have a frusto-conic outer profile wherein the first end 182 (the top end) is narrower than the second end 184 (the lower end). Although not shown, the body 178 of the first manifold regulator 161 may be housed within a housing or may be otherwise surrounded and/or attached to a support structure of the work vehicle 100.

The second end 184 may include an engagement feature 186, such as gear teeth, a member of a joint, or other coupling feature. The body 178 may be supported for rotation about a rotation axis 188 on the work vehicle 100. In some embodiments, the rotation axis 188 may be substantially parallel to the vertical axis 126 (FIG. 1). The engagement feature 186 may be configured for driving rotation of the body 178 about the rotation axis 188 as will be discussed.

The body 178 of the first manifold regulator 161 may at least partly define a channel 190. The channel 190 may be a through-hole that extends continuously through the body 178 from the first end 182 to the second end 184 in some embodiments. In other embodiments, the body 178 and a surrounding housing may cooperate to define the channel 190.

The channel 190 may include an inlet 194 and an outlet 196. The inlet 194 may be defined proximate the first end 182, and the outlet 196 may be disposed proximate the second end 184.

The channel 190 may extend along a substantially straight axis 192. The axis 192 of the channel 190 may be disposed at a positive angle relative to the rotation axis 188 of the first commodity manifold 151. In some embodiments, the axis 192 and the rotation axis 188 may intersect at the first end 182 of the body 178.

The first manifold regulator 161 may be supported within the delivery system 132 such that the inlet 194 of the channel 190 is in communication with the metering system 130 and, further upstream, with the commodity container 128. As will be discussed, rotation of the body 178 may move the outlet 196 relative to downstream components to thereby change the path of the commodity through the delivery system 132.

As shown in FIGS. 3 and 4, the first commodity manifold 151 may further include a manifold seat 206. The manifold seat 206 may be a unitary part made of substantially rigid material. The manifold seat 206 may include an upper disc 208 that is layered below the second end 184 of the first manifold regulator 161. The upper disc 208 may abut against and support sliding rotational movement of the second end 184 thereon. The manifold seat 206 may include a plurality (e.g., three) ports or branches 210. The branches may be hollow and cylindrical and may project downward from the upper disc 208. The branches 210 may also be spaced apart angularly about the rotation axis 188.

Moreover, the first commodity manifold 151 may include a plurality of conduits that are attached to respective ones of the branches 210 of the manifold seat 206. The conduits may be hollow tubes or pipes made from rigid material in some embodiments. As shown, the first commodity manifold 151 may include a first conduit 212, a second conduit 214, and a third conduit 216, each defining a respective conduit passage therethrough. The first conduit 212, second conduit 214, and third conduit 216 may be attached to respective ones of the branches 210 of the manifold seat 206 and may extend generally vertically downward therefrom to connect to respective ones of the run structures 127. Also, in some embodiments, the passage of the first conduit 212 may extend substantially straight downward and substantially parallel to the rotation axis 188. The passage of the second and third conduits 214, 216 may be nonlinear.

As mentioned, the sub-set 142 of the run structures 127 of the first commodity manifold 151 may include the first run structure 171 with the first run passage 174, the second run structure 172 with the second run passage 175, and the third run structure 173 with the third run passage 176. The first, second, and third run structures 171, 172, 173 may be rigid pipes or tubes. The run structures 171, 172, 173 may differ in shape, dimension, or otherwise. For example, the inner diameter of the first and second run structures 171, 172 may be slightly larger than the inner diameter of the third run structures 173.

As shown in FIG. 4, the first run structure 171 may extend along a first run axis 221 between a first end 220 and a second end 225 of the first run structure 171. The first run structure 171 may also include an intermediate segment 224 that extends between the first and second ends 220, 225. The intermediate segment 224 may be tapered inward toward the axis 221 as compared to the first end 220 and the second end 225. The first run structure 171 may further include a hollow inlet projection 230 that projects transversely from the axis 221 and that is in fluid communication with the first run passage 174.

The lower end of the first conduit 212 may be attached to the first inlet projection 230 of the first run structure 171. Accordingly, there may be a continuous passage defined from one of the branches 210 of the manifold seat 206, through the first conduit 212, through the inlet projection 230 of the first run structure 171, and into the first run passage 174 of the first run structure 171.

The second run structure 172 may be configured similarly, except that the second conduit 214, extending from a different branch 210 of the manifold seat 206, is attached to the second run structure 172 to fluidly communicate with the second run passage 175. Also, the second run passage 175 may extend along a second run axis 222. The third conduit 216 may extend between the remaining branch 210 of the manifold seat 206 to connect to the third run structure 172 and the third run passage 176 therein. The third run passage 176 may extend along a third run axis 223.

In some embodiments, the first, second, and third run axes 221, 222, 223 may be substantially parallel to each other. Also, the first, second, and third run axes 221, 222, 223 may be substantially parallel to the longitudinal axis 118 of the work vehicle 100 in some embodiments. Furthermore, the rotation axis 188 may be substantially normal to the first, second, and third run axes 221, 222, 223.

As shown in FIG. 4, the first and second run structures 171, 172 (and their axes 221, 222) may be spaced apart at a first vertical distance 250 from each other. The second and third run structures 172, 173 may be spaced apart at a second vertical distance 252. The second run structure 172 may be disposed vertically between the first and third run structures 171, 173. Additionally, as shown in FIG. 2, the first and second run structures 171, 172 may be spaced apart at a first horizontal distance 254. The second and third run structures 172, 173 may also be spaced apart at a second horizontal distance 256. The first run structure 171 may be disposed horizontally between the second and third run structures 172, 173. The second and third conduits 214, 216 may wrap around opposite sides of the first run structure 171 and extend to the second and third run structures 172, 173, respectively.

The body 178 of the first manifold regulator 161 may rotate about the rotation axis 188 relative to the manifold seat 206 and move between a variety of angular positions. The inlet 194 of the channel 190 may remain in communication with the commodity source (i.e., the commodity container 128, the metering system 130, etc.) as the first manifold regulator 161 moves between its various positions. However, the outlet 196 may angularly move between the different branches 210 of the manifold seat 206 as the body 178 rotates about the axis 188.

For example, in a first position, the outlet 196 may be in communication with the passage of the first conduit 212 and the first run passage 174 of the first run structure 171. In this first position, the outlet 196 may be disconnected from the second conduit 214 and the second run structure 172 as well as the third conduit 216 and the third run structure 173. In some embodiments, the body 178 of the first manifold regulator 161 may substantially block the branches 210 of the manifold seat 206 in this first position.

In a second position of the first manifold regulator 161, the outlet 196 may be in communication with the passage of the second conduit 214 and the second run passage 175 of the second run structure 172. Also, the body 178 may disconnect the channel 190 from the first and third conduits 212, 216 and the first and third run structures 171, 173.

In a third position of the first manifold regulator 161, the outlet 196 may be in communication with the passage of the third conduit 216 and the third run passage 176 of the third run structure 173. Also, the body 178 may disconnect the channel 190 from the first and second conduits 212, 214 and the first and second run structures 171, 172.

In some embodiments, the first manifold regulator 161 may have a shut-off position, wherein the outlet 196 of the channel 190 is disconnected from each of the three branches 210 of the manifold seat 206. In this shut-off position, the commodity may be blocked from travelling out of the channel 190 further downstream in the delivery system 132. Additionally, in some embodiments, the first manifold regulator 161 may have an intermediate position, wherein the outlet 196 is simultaneously connected to multiple branches 210 such that commodity is simultaneously provided to multiple ones of the run structures 127.

As shown in FIG. 2, the first manifold regulator 161 may be operably attached to a linkage 260. The linkage 260 may be an elongate bar in some embodiments. The linkage 260 may be threaded and threadably attached to the engagement feature 186 of the body 178. In the illustrated embodiment, the linkage 260 is engaged to the engagement feature 186 as a worm drive; however, it will be appreciated that the linkage 260 may be configured differently without departing from the scope of the present disclosure. For example, in an additional embodiment, the linkage 260 may extend parallel to the axis 188 and may include a spur gear that meshes with the engagement feature 186. In these various embodiments, rotation of the linkage 260 about its axis may drive rotation of the first manifold regulator 261 about the rotation axis 188.

In some embodiments, the actuator 180 (described above with respect to FIG. 1) may be operably attached to the linkage 260 for automatic rotation of the linkage 260 and the first manifold regulator 161. The actuator 180 may be operatively connected to the control system 140. The control system 140 may include a processor 200. The processor 200 may comprise hardware, software, and/or firmware components configured to enable communications and/or interaction with the actuator 180. The control system 140 may also include a memory element (e.g., RAM memory, flash memory, EPROM memory, EEPROM memory, registers, a hard disk, a removable disk, a CD-ROM, or any other form of storage medium known in the art). In this regard, the memory element can be coupled to the processor 200 such that the processor 200 can read information from, and write information to, the memory element. In the alternative, the memory element may be integral to the processor 200. As an example, the processor 200 and the memory element may reside in an ASIC. The control system 140 may further include a user interface (U/I) with buttons, dials, displays, speakers, and/or other components which a user may manually input commands and/or receive output. Depending on the embodiment, the processor 200 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 200 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 200 includes processing logic that may be configured to carry out the functions, techniques, and processing tasks associated with the operation of the control system 140. Furthermore, the steps of a method or algorithm described in connection with the embodiments disclosed herein may be embodied directly in hardware, in firmware, in a software module executed by the processor 200, or in any practical combination thereof.

The control system 140 may also be in communication with one or more sensors 201. In some embodiments, the sensor 201 may be a position sensor configured to detect a position of the manifold regulator 161. The processor 200 may receive position data from the sensor 201 corresponding to the detected position, and the processor 200 may utilize this information in a variety of ways for operation of the delivery system 132, the metering system 130, and/or other systems.

Furthermore, the control system 140 may be in communication with a user interface 202. The user interface 202 may include various input components (e.g., control knobs, dials, buttons, etc.) with which a user may input a user command. The user interface 202 may further include one or more output components such as a display 203, an audio speaker, etc.

During operation, the processor 200 may receive one or more input signals from the user interface 202, the sensors 201, etc. For example, a user may input a user command via the user interface 202 that corresponds to a target position for the manifold regulators 129. The processor 200 may, as a result, generate and send corresponding control commands to the actuator 180. The actuator 180 may actuate to rotate the linkage 260 and ultimately drive the manifold regulator 161 toward the target position. In some embodiments, the sensor 201 may detect the current, actual position of the manifold regulator 161 and provide feedback to the processor 200 for closed-loop control. As such, the actuator 180 may continue to actuate until the detected actual position of the manifold regulator 161 (detected by the sensor 201) substantially matches the target position input by the user. In some embodiments, the sensor 201 may also provide input to the processor 200 such that the processor 200 may provide commands to the display 203 or other component of the user interface 202 to inform the user of the current position of the manifold regulator 161 and/or other operating conditions of the delivery system 132.

It will be appreciated that the regulator 129 may be operatively connected to any number of runs 133. Although three run structures 171, 172, 173 are shown in FIGS. 3 and 4, the regulator 129 may be attached to four, five, six, or more run structures and operate similar to the embodiments discussed above. In an additional embodiment of the present disclosure, the regulator 129 may be operatively connected to a single run structure (e.g., for operation as a shut-off valve). In such embodiments, the seat of the regulator may be reconfigured with a single branch and a single conduit that connects the regulator 129 to the sole run structure. The regulator 129 may be rotated about the axis 188 between an open position and a closed position. In the open position, the channel 190 of the regulator 129 may fluidly connect to the conduit, allowing commodity to flow through to the sole run structure. In the closed position, the channel 190 of the regulator 129 may be fluidly disconnected, cutting off flow to the run structure.

Referring back FIG. 2, the illustrated embodiment will be discussed in additional detail. As shown, the commodity manifolds 150 may be configured similar to the first commodity manifold 151. The second commodity manifold 152 may be disposed adjacent (e.g., horizontally adjacent) to the first commodity manifold 151. The third commodity manifold 153 may be arranged next in the horizontal sequence and so on.

The commodity manifolds may be nested together along the lateral axis 124. For example, the third conduit 216 of the second commodity manifold 152 may curve about a portion of the second run structure 172 of the first commodity manifold 152. The third conduit 216 of the second commodity manifold 152 may abut against and curve according to the outer contour of the surface of second run structure 172. This arrangement may be repeated across the sequence of the commodity manifolds. The second conduits 214 may also curve and/or abut against the first run structure 171 of the neighboring commodity manifold as well.

Furthermore, the first run structures 171 of the plurality of commodity manifolds may be substantially aligned and arranged in a first horizontal row 280. The second run structures 172 of the plurality of commodity manifolds may be aligned and arranged in a second horizontal row 281. The third run structures 173 of the plurality of commodity manifolds may be aligned and arranged in a third horizontal row 282. The rows 280, 281, 282 may be offset horizontally. In some embodiments, the horizontal offset may be substantially equal to a width of one of the conduits 212, 214, 216. Furthermore, the first row 280 may be spaced above the second row 281 equal to the vertical distance 250 (FIG. 4). The third row 282 may be spaced below the second row 281 equal to the vertical distance 252 in some embodiments.

As stated above, the first commodity manifold 151 may include the first manifold regulator 161. The second commodity manifold 152 may include a second manifold regulator 162 for selecting the downstream pathway to one of the run structures 127 of the second commodity manifold 152. Likewise, the third commodity manifold 153 may include a respective third manifold regulator 163, the fourth commodity manifold 153 may include a respective fourth manifold regulator 164, the fifth commodity manifold 155 may include a respective fifth manifold regulator 165, the sixth commodity manifold 156 may include a respective sixth manifold regulator 166, the seventh commodity manifold 157 may include a respective seventh manifold regulator 167, and the eighth commodity manifold 158 may include a respective eighth manifold regulator 168.

In some embodiments, the linkage 260 may be operably attached to the manifold regulators 129. For example, the manifold regulators 129 may be arranged in a horizontal row, and the threading on the linkage 260 may receive the teeth of the engagement features 186 of the manifold regulators 129. Accordingly, rotation of the linkage 260 may simultaneously rotate the manifold regulators 129 between the various positions. The control system 140 may, therefore, automatically control this simultaneous movement for controlling the delivery system 132.

It will be appreciated that the position of the manifold regulators 129 may be controlled (manually or automatically) in a variety of ways. For example, the position of the manifold regulators 129 may be controlled according to the type of metering that will be performed during planting operations. For example, some operations may call for volumetric metering (with the metering system 130) while other operations may call for singulated metering (with the downstream metering system 131). As an example, in some embodiments, the third row 282 of run structures 127 may be attached to the downstream metering system 131 whereas the first row 280 and second row 281 are not. As such, when volumetric metering is necessary, the manifold regulators 129 may be rotated to the first or second positions to deliver the commodity via the first and/or second rows 280, 281. In contrast, when singulated metering is necessary, the manifold regulators 129 may be rotated to the third position to deliver the commodity via the third row 282.

The position of the manifold regulators 129 may also be controlled (manually or automatically) according to the type of commodity being applied. For example, if fertilizer or other commodity with a high application rate is being applied, the regulators 129 may be turned to the first position to provide the fertilizer via the first row 280. This may be advantageous since, in the illustrated embodiment, the path to the first row 280 of run structures 127 is the more direct (i.e., shorter axial length, straighter, etc.) as compared to the path to the second row 281 and third row 282. If seed or other commodity with a lower application is being run, the regulators 129 may be turned to the second position to provide the seed via the second row 281. Otherwise, the regulators 129 may be turned to the third position to provide the seed via the third row 282.

Accordingly, the delivery system 132 of the present disclosure may selectively distribute the commodity along a large number of potential pathways towards the row units. Even so, the delivery system may be arranged in a compact and well-organized manner. Also, the overall part count may remain relatively low.

Furthermore, the manifold regulator 129 of the present disclosure is a compact, effective, robust component. There are relatively few points to seal (e.g., above and below the manifold regulator 129). Therefore, sealing the system 132 may be achieved effectively with relatively few parts. Accordingly, the work vehicle 100 may deliver a controlled amount of commodity to a large number of row units 101 for efficient planting operations.

Also, the following examples are provided, which are numbered for easier reference.

1. A work vehicle comprising: a commodity source; a delivery system configured to receive a commodity from the commodity source and distribute the commodity between a plurality of delivery runs, the delivery system including at least one commodity manifold that includes: a first run structure with a first run passage; a second run with a second run passage; and a manifold regulator with a body that is rotatable about a rotation axis between a first position and a second position, the body at least partly defining a channel configured to receive and distribute the commodity, the channel having an inlet and an outlet, the inlet in communication with the commodity source in the first position and the second position, the outlet in communication with the first run passage and disconnected from the second run passage in the first position, the outlet in communication with the second run passage and disconnected from the first run passage in the second position.

2. The work vehicle of example 1, further comprising a third run structure with a third run passage; and wherein the body is rotatable about the rotation axis between the first position, the second position, and a third position; wherein the inlet is in communication with the commodity source in the first, second, and third positions; wherein the outlet, in the first position, is in communication with the first run passage and is disconnected from the second and third run passage; wherein the outlet, in the second position, is in communication with the second run passage and is disconnected from the first and third run passage; and wherein the outlet, in the third position, is in communication with the third run passage and is disconnected from the first and second run passage.

3. The work vehicle of example 2, wherein the first run passage extends along a first run axis; wherein the second run passage extends along a second run axis; wherein the third run passage extends along a third run axis; wherein the first, second, and third run axes are substantially parallel.

4. The work vehicle of example 3, wherein the rotation axis is substantially normal to the first, second, and third run axes.

5. The work vehicle of example 3, wherein the first run structure is spaced apart at a first vertical distance above the second run; and wherein the third run structure is spaced apart at a second vertical distance below the second run structure.

6. The work vehicle of example 3, wherein the at least one commodity manifold includes a plurality of commodity manifolds; wherein the first run structures of the plurality of commodity manifolds are arranged in a first horizontal row; wherein the second run structures of the plurality of commodity manifolds are arranged in a second horizontal row; wherein the third run structures of the plurality of commodity manifolds are arranged in a third horizontal row; wherein the first horizontal row is spaced apart at the first vertical distance above the second horizontal row; and wherein the third horizontal row is spaced apart at the second vertical distance below the second horizontal row.

7. The work vehicle of example 3, wherein at least two of the first run structure, the second run structure, and the third run structure are spaced apart at a horizontal distance.

8. The work vehicle of example 7, further comprising a first conduit with a first conduit passage in communication with the first run passage, a second conduit with a second conduit passage in communication with the second run passage, and a third conduit with a third conduit passage in communication with the third run passage; wherein the outlet, in the first position, is in communication with the first conduit passage; wherein the outlet, in the second position, is in communication with the second conduit passage; wherein the outlet, in the third position, is in communication with the third conduit passage; wherein the first conduit passage is substantially straight; and wherein the second and third conduit passages are nonlinear.

9. The work vehicle of example 1, wherein the body is rotatable about the axis between the first position, the second position, and a shut-off position; and wherein the inlet is in communication with the commodity source in the first, second, and shut-off positions; and wherein the outlet, in the shut-off position, is disconnected from the first and second run.

10. The work vehicle of example 1, wherein the body has a frusto-conic outer profile.

11. The work vehicle of example 1, wherein the channel extends along a channel axis that is substantially straight between the inlet and the outlet; wherein the channel axis intersects the rotation axis proximate the inlet; and wherein the channel axis is disposed at an angle relative to the rotation axis.

12. The work vehicle of example 1, wherein the at least one commodity manifold includes a plurality of commodity manifolds; further comprising a linkage that is operably attached to the manifold regulators of the plurality of commodity manifolds; and wherein the linkage is configured to simultaneously rotate the manifold regulators between the first position and the second position.

13. The work vehicle of example 12, further comprising an actuator configured to automatically actuate the linkage to simultaneously rotate the manifold regulators between the first position and the second position.

14. A work vehicle comprising: a commodity source; a delivery system configured to receive a commodity from the commodity source and move the commodity away from the work vehicle, the delivery system including: at least one run structure with a run passage; a regulator with a body that is rotatable about a rotation axis between a first position and a second position, the body at least partly defining a channel configured to receive the commodity from the commodity source, the channel having an inlet and an outlet, the inlet in communication with the commodity source in the first position and the second position, the outlet in communication with the run passage in the first position, the outlet disconnected from the run passage in the second position.

15. The work vehicle of example 14, wherein the at least one run structure includes a first run structure with a first run passage and a second run structure with a second run passage; wherein the body is rotatable about the rotation axis between the first position, the second position, and a third position; wherein the inlet is in communication with the commodity source in the first position, the second position, and the third position; wherein the outlet is in communication with the first run passage and is disconnected from the second run passage in the first position; wherein the outlet is disconnected from the first run passage and the second run passage in the second position; and wherein the outlet is in communication with the second run passage and is disconnected from the first run passage in the third position.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
    a commodity source;
    a delivery system configured to receive a commodity from the commodity source and distribute the commodity between a plurality of delivery runs, the delivery system including at least one commodity manifold that includes:
        a first run structure with a first run passage;
        a second run structure with a second run passage; and
        a manifold regulator with a body that is rotatable about a rotation axis between a first position and a second position, the body at least partly defining a channel configured to receive and distribute the commodity, the channel having an inlet and an outlet, the inlet in communication with the commodity source in the first position and the second position, the outlet in communication with the first run passage and disconnected from the second run passage in the first position, the outlet in communication with the second run passage and disconnected from the first run passage in the second position;
        wherein the body is rotatable about the axis between the first position, the second position, and a shut-off position;
        wherein the inlet is in communication with the commodity source in the first, second, and shut-off positions; and
        wherein the outlet, in the shut-off position, is disconnected from the first and second run.

2. The work vehicle of claim 1, further comprising a third run structure with a third run passage; and
    wherein the body is rotatable about the rotation axis between the first position, the second position, and a third position;
    wherein the inlet is in communication with the commodity source in the first, second, and third positions;
    wherein the outlet, in the first position, is in communication with the first run passage and is disconnected from the second and third run passage;
    wherein the outlet, in the second position, is in communication with the second run passage and is disconnected from the first and third run passage; and
    wherein the outlet, in the third position, is in communication with the third run passage and is disconnected from the first and second run passage.

3. The work vehicle of claim 2, wherein the first run passage extends along a first run axis;
    wherein the second run passage extends along a second run axis;
    wherein the third run passage extends along a third run axis;
    wherein the first, second, and third run axes are substantially parallel.

4. The work vehicle of claim 3, wherein the rotation axis is substantially normal to the first, second, and third run axes.

5. The work vehicle of claim 3, wherein the first run structure is spaced apart at a first vertical distance above the second run; and
    wherein the third run structure is spaced apart at a second vertical distance below the second run structure.

6. A work vehicle comprising:
    a commodity source;
    a delivery system configured to receive a commodity from the commodity source and distribute the commodity between a plurality of delivery runs, the delivery system including at least one commodity manifold that includes:
        a first run structure with a first run passage;
        a second run structure with a second run passage;
        a third run structure with a third run passage; and
        a manifold regulator with a body that is rotatable about a rotation axis between a first position and a second position, the body at least partly defining a channel configured to receive and distribute the commodity, the channel having an inlet and an outlet, the inlet in communication with the commodity source in the first position and the second position, the outlet in communication with the first run passage and disconnected from the second run passage in the first position, the outlet in communication with the second run passage and disconnected from the first run passage in the second position;
        wherein the body is rotatable about the rotation axis between the first position, the second position, and a third position;

wherein the inlet is in communication with the commodity source in the first, second, and third positions;

wherein the outlet, in the first position, is in communication with the first run passage and is disconnected from the second and third run passage;

wherein the outlet, in the second position, is in communication with the second run passage and is disconnected from the first and third run passage;

wherein the outlet, in the third position, is in communication with the third run passage and is disconnected from the first and second run passage;

wherein the first run passage extends along a first run axis;

wherein the second run passage extends along a second run axis;

wherein the third run passage extends along a third run axis;

wherein the first, second, and third run axes are substantially parallel;

wherein the at least one commodity manifold includes a plurality of commodity manifolds;

wherein the first run structures of the plurality of commodity manifolds are arranged in a first horizontal row;

wherein the second run structures of the plurality of commodity manifolds are arranged in a second horizontal row;

wherein the third run structures of the plurality of commodity manifolds are arranged in a third horizontal row;

wherein the first horizontal row is spaced apart at the first vertical distance above the second horizontal row; and wherein the third horizontal row is spaced apart at the second vertical distance below the second horizontal row.

7. The work vehicle of claim 3, wherein at least two of the first run structure, the second run structure, and the third run structure are spaced apart at a horizontal distance.

8. A work vehicle comprising:
a commodity source;
a delivery system configured to receive a commodity from the commodity source and distribute the commodity between a plurality of delivery runs, the delivery system including at least one commodity manifold that includes:
a first run structure with a first run passage;
a second run structure with a second run passage;
a third run structure with a third run passage; and
a manifold regulator with a body that is rotatable about a rotation axis between a first position and a second position, the body at least partly defining a channel configured to receive and distribute the commodity, the channel having an inlet and an outlet, the inlet in communication with the commodity source in the first position and the second position, the outlet in communication with the first run passage and disconnected from the second run passage in the first position, the outlet in communication with the second run passage and disconnected from the first run passage in the second position;
wherein the body is rotatable about the rotation axis between the first position, the second position, and a third position;

wherein the inlet is in communication with the commodity source in the first, second, and third positions;

wherein the outlet, in the first position, is in communication with the first run passage and is disconnected from the second and third run passage;

wherein the outlet, in the second position, is in communication with the second run passage and is disconnected from the first and third run passage;

wherein the outlet, in the third position, is in communication with the third run passage and is disconnected from the first and second run passage;

wherein the first run passage extends along a first run axis;

wherein the second run passage extends along a second run axis;

wherein the third run passage extends along a third run axis;

wherein the first, second, and third run axes are substantially parallel; and wherein at least two of the first run structure, the second run structure, and the third run structure are spaced apart at a horizontal distance;

further comprising a first conduit with a first conduit passage in communication with the first run passage, a second conduit with a second conduit passage in communication with the second run passage, and a third conduit with a third conduit passage in communication with the third run passage;

wherein the outlet, in the first position, is in communication with the first conduit passage;

wherein the outlet, in the second position, is in communication with the second conduit passage;

wherein the outlet, in the third position, is in communication with the third conduit passage;

wherein the first conduit passage is substantially straight; and wherein the second and third conduit passages are nonlinear.

9. The work vehicle of claim 1, wherein the body has a frusto-conic outer profile.

10. The work vehicle of claim 1, wherein the channel extends along a channel axis that is substantially straight between the inlet and the outlet;
wherein the channel axis intersects the rotation axis proximate the inlet; and
wherein the channel axis is disposed at an angle relative to the rotation axis.

11. A work vehicle comprising:
a commodity source;
a delivery system configured to receive a commodity from the commodity source and distribute the commodity between a plurality of delivery runs, the delivery system including at least one commodity manifold that includes:
a first run structure with a first run passage;
a second run structure with a second run passage; and
a manifold regulator with a body that is rotatable about a rotation axis between a first position and a second position, the body at least partly defining a channel configured to receive and distribute the commodity, the channel having an inlet and an outlet, the inlet in communication with the commodity source in the first position and the second position, the outlet in communication with the first run passage and disconnected from the second run passage in the first position, the outlet in communication with the second run passage and disconnected from the first run passage in the second position;

wherein the at least one commodity manifold includes a plurality of commodity manifolds;

further comprising a linkage that is operably attached to the manifold regulators of the plurality of commodity manifolds; and wherein the linkage is configured to simultaneously rotate the manifold regulators between the first position and the second position.

12. The work vehicle of claim 11, further comprising an actuator configured to automatically actuate the linkage to simultaneously rotate the manifold regulators between the first position and the second position.

13. A method of operating a delivery system of a work vehicle comprising:

selectively distributing a commodity from a commodity source by selectively rotating a body of a manifold regulator about a rotation axis between a first position and a second position, the body at least partly defining a channel configured to receive and distribute the commodity, the channel having an inlet and an outlet, the inlet in communication with the commodity source in the first position and the second position;

when the manifold regulator is rotated into the first position, communicating the outlet with a first run passage of a first run structure and disconnecting the outlet from a second run passage of a second run structure; and when the manifold regulator is rotated into the second position, communicating the outlet with the second run passage and disconnecting the outlet from the first run passage;

wherein the body is rotatable about the axis between the first position, the second position, and a shut-off position;

wherein the inlet is in communication with the commodity source in the first, second, and shut-off positions; and wherein the outlet, in the shut-off position, is disconnected from the first and second run.

14. The method of claim 13, further comprising actuating an actuator to automatically and selectively rotate the body.

15. The method of claim 14, wherein actuating the actuator includes rotating the body and simultaneously rotating another body of another manifold regulator of the work vehicle.

16. The method of claim 13, wherein selectively rotating the body includes selectively rotating the body between the first position, the second position, and a third position, the inlet in communication with the commodity source in the first, second, and third positions;

further comprising, in the first position, communicating the outlet with the first run passage, disconnecting the outlet from the second run passage, and disconnecting the outlet from a third run passage of a third run structure;

further comprising, in the second position, communicating the outlet with the second run passage, disconnecting the outlet from the first run passage and the third run passage; and further comprising, in the third position, communicating the outlet with the third run passage, disconnecting the outlet from the first run passage and the second run passage.

17. A work vehicle comprising:

a commodity source;

a delivery system configured to receive a commodity from the commodity source and move the commodity away from the work vehicle, the delivery system including:

at least one run structure with a run passage;

a regulator with a body that is rotatable about a rotation axis between a first position and a second position, the body at least partly defining a channel configured to receive the commodity from the commodity source, the channel having an inlet and an outlet, the inlet in communication with the commodity source in the first position and the second position, the outlet in communication with the run passage in the first position, the outlet disconnected from the run passage in the second position;

wherein the body is rotatable about the axis between the first position, the second position, and a shut-off position;

wherein the inlet is in communication with the commodity source in the first, second, and shut-off positions; and wherein the outlet, in the shut-off position, is disconnected from the first and second run.

18. The work vehicle of claim 17, wherein the run passage extends along a run axis; and wherein the run axis is substantially normal to the rotation axis.

19. The work vehicle of claim 17, wherein the at least one run structure includes a first run structure with a first run passage and a second run structure with a second run passage;

wherein the body is rotatable about the rotation axis between the first position, the second position, and a third position;

wherein the inlet is in communication with the commodity source in the first position, the second position, and the third position;

wherein the outlet is in communication with the first run passage and is disconnected from the second run passage in the first position;

wherein the outlet is disconnected from the first run passage and the second run passage in the second position; and wherein the outlet is in communication with the second run passage and is disconnected from the first run passage in the third position.

* * * * *